United States Patent [19]

Rines

[11] Patent Number: 5,454,582
[45] Date of Patent: Oct. 3, 1995

[54] APPARATUS FOR HITCHING A TRAILER COUPLER TO A HITCH BALL

[76] Inventor: Hubert M. Rines, 495 Anne St., Yoncalla, Oreg. 97499

[21] Appl. No.: 224,886

[22] Filed: Apr. 8, 1994

[51] Int. Cl.⁶ .................................................. B60D 1/06
[52] U.S. Cl. .......................................... 280/477; 280/511
[58] Field of Search ................................ 280/477, 478.1, 280/491.1, 504, 508, 511

[56] References Cited

U.S. PATENT DOCUMENTS

| | | | |
|---|---|---|---|
| 3,740,077 | 6/1973 | Williams | 280/475 |
| 3,871,535 | 3/1975 | Fenske | 214/86 |
| 4,057,266 | 11/1977 | Duncan et al. | 280/477 |
| 4,254,968 | 3/1981 | Del Vecchio | 280/477 |
| 4,431,208 | 2/1984 | Geeves | 280/477 X |
| 4,903,978 | 2/1990 | Schrum, III | 280/477 |
| 5,114,170 | 5/1992 | Lanni et al. | 280/477 |
| 5,261,687 | 11/1993 | Bergman | 280/478.1 |

Primary Examiner—Mitchell J. Hill
Assistant Examiner—F. Zeender
Attorney, Agent, or Firm—James D. Givnan, Jr.

[57] ABSTRACT

An apparatus facilitating coupling of a trailer to a tow vehicle includes a barrier against which a hitch ball may be positioned in the first stage of a hitching effort. The barrier includes clamps for barrier attachment to the trailer coupling. Support rods and a support plate on the barrier serve to position the barrier rearwardly adjacent the coupler socket. The barrier support plate may be inclined to abut a trailer frame having an inclined frontal surface. To position the trailer coupler laterally into place above a hitch ball, a lever is provided which utilizes the hitch ball as a fulcrum. An arm on the lever is engageable with the coupler to permit the application of force to move the trailer tongue and coupler into place above the hitch ball. Lowering of a trailer mounted jack results in downward engagement with the coupler onto the hitch ball. The barrier and lever are installed and removed without tools.

7 Claims, 1 Drawing Sheet

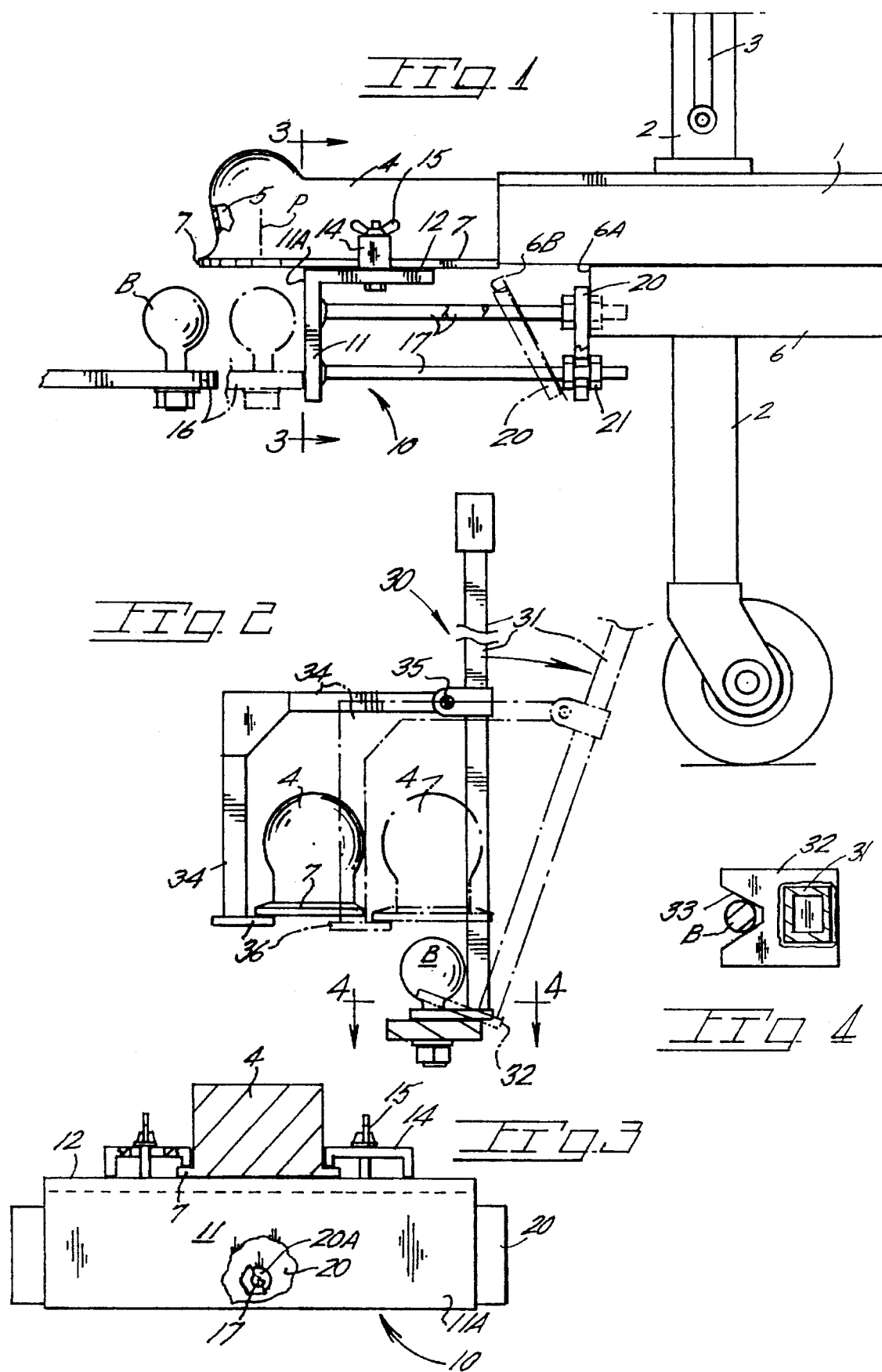

APPARATUS FOR HITCHING A TRAILER COUPLER TO A HITCH BALL

BACKGROUND OF THE INVENTION

The present invention pertains to that class of equipment facilitating the engagement of a trailer mounted coupler with a hitch ball on a tow vehicle.

In the typical hitching operation of a trailer to a tow vehicle it is common practice to back the tow vehicle to locate a trailer hitch ball on the vehicle directly below a coupler at the forward end of the trailer tongue. Considerable expertise is required to accurately position the hitch ball, both longitudinally and laterally, to permit lowering of the coupler into place on the ball. If not so positioned, substantial physical effort is required to so position the trailer mounted coupler. It is not uncommon for several attempts to be made by the driver of the tow vehicle to locate the hitch ball in a suitable position to receive the coupler.

Attempts to remedy the above hitching problems have included accessories permanently attached to the trailer which are undesirable in view of added weight as well as potential loss by theft or accidental separation from the trailer. Additionally, prior art apparatuses are of a complex nature and hence costly construction, require permanent alteration of hitch components and require a degree of mechanical skill or familiarity with the equipment. An example of such a coupling aid is disclosed in U.S. Pat. No. 4,057,255. U.S. Pat. No. 3,871,535 discloses a hitch assembly to elevate and tow an auto behind a motor home wherein a hitch ball is laterally swingable to facilitate engagement with an auto mounted coupler.

SUMMARY OF THE PRESENT INVENTION

The present invention is embodied within an apparatus for spotting a vehicle attached hitch ball in fore and aft relationship to a trailer coupler and in lever means for laterally manually positioning the coupler into place over the hitch ball.

The present apparatus includes limit stop means temporarily affixed to the trailer coupler, without alteration thereof, to provide a barrier contactable by a trailer hitch ball carried by the tow vehicle. The limit stop means include a barrier having attachment means for temporary engagement with the peripheral flange of a trailer coupler and also barrier supports which support the barrier against horizontally directed loads upon impact of the vehicle mounted hitch ball. The limit stop means includes an adjustable feature to compensate for the different distances between the forward end of a trailer frame, against which the support rests, and a vertical plane containing the socket of the trailer coupler. Accordingly the present apparatus is suitable for use with a wide range of trailer makes and models. The limit stop means, temporarily fitted to the trailer coupler during fore and aft positioning of the hitch ball, are thereafter removed upon loosening of a couple of clamp components. For lateral positioning of the trailer coupler over the fore and aft positioned hitch ball, lever means is provided including an arm for applying lateral movement to the trailer tongue and coupler the latter into place above the hitch ball. The lever provides adequate leverage to permit such lateral movement of the trailer tongue and coupler for a majority of recreational trailers. When not in use both the limit stop means as well as the lever lend themselves to compact storage.

Important objectives of the present invention include the provision of an apparatus comprising a barrier for limiting closing movement between a trailer hitch ball and a trailer mounted coupler to properly locate the ball in transverse vertical plane containing the center of the coupler socket; the provision of lever means engageable with a hitch ball to provide a fulcrum and having a pivoted arm for hooked engagement with a trailer mounted coupler enabling the application of force to position the coupler above the hitch ball; the provision of an apparatus facilitating a hitching operation including limit stop means having a support plate for abutment with vertical or inclined surfaces of a trailer frame member so as to bear loads momentarily imparted during positioning of a hitch ball.

BRIEF DESCRIPTION OF THE DRAWINGS

In the accompanying drawings:

FIG. 1 is a side elevational view of a trailer tongue and coupler thereon with limit stop means of the present apparatus in place;

FIG. 2 is an end elevational view taken from the left side of FIG. 1 but with lever means engaged with the hitch ball and trailer coupler;

FIG. 3 is a vertical sectional view taken along line 3—3 of FIG. 1; and

FIG. 4 is a horizontal sectional view taken downwardly along line 4—4 of FIG. 2.

DETAILED DESCRIPTION OF THE PREFERRED EMBODIMENTS

With continuing attention to the drawings, wherein applied reference numerals indicate parts similarly hereinafter identified, the reference numeral 1 indicates the tongue of a trailer which may be of the type commonly towed by a light truck or automobile, as for example, a recreational trailer. A trailer jack is at 2, having a crank at 3, which may be horizontally disposed to raise and lower tongue 1. A trailer coupler is at 4 and includes a socket area at 5. Located below tongue i is a trailer frame member 6, which terminates at a distance from a vertical plane P containing the center of coupler socket area 5. Additionally, frame member 6 may terminate at a vertical surface 6A or, depending on trailer makes and models, may terminate in an inclined surface as at 6B. A peripheral flange 7 extends in typical fashion about the lower edge of coupler 4. The foregoing is intended to be a general description of well known current trailer structure.

With attention to the present invention, limit stop means are shown generally at 10 and include a barrier 11, preferably an angular plate to provide a surface 12 for attachment means including clamps at 14, each of which may be clamped to surface 12 and flange 7 of the coupler by wing nuts 15 to firmly attach barrier 11 to the underside of coupler 4. The frontal upright surface 11A of barrier 11 will constitute a stop for a hitch ball B carried by a vehicle draw bar 16. Supporting barrier 11 in place against horizontal loads, imparted by ball B and bar 16 during a hitching operation, are barrier supports 17, each having a threaded end segment on which is adjustably mounted a barrier support plate 20. Plate 20 defines apertures 20A of a size to loosely receive the bolt-like barrier supports 17 in a manner permitting the plate to cant to abut in a flush manner forward ends 6A or 6B found on different types of trailers. Cooperating nut elements 21 permit positioning of barrier support plate 20 to provide such surface engagement with whichever trailer frame end surface is encountered. Additionally the threaded end segments of barrier supports 17 permit barrier support plate 20 to be adjusted to support barrier 11 in a slightly rearwardly offset manner from a medial plane P of coupler socket 5 so as to properly spot hitch ball B in transverse vertical plane P. Once adjusted for a specific trailer barrier support plate 20 will not require repositioning until used with another make and model of trailer.

In FIG. 2, lever means generally at 30 include a lever 31 having a foot 32, having a notch or recess 33 for receiving the neck of hitch ball B. An arm 34 is hingedly mounted at 35 to lever 31 and is preferably of angular configuration with a retainer 36 at its distal end. Retainer 36 projects from the arm end to underlie a portion of coupler 4 to retain arm engagement during application of forces imparted by lever 31 manually positioned during a hitching operation in vertical plane P transverse to the trailer tongue centerline. While FIG. 2 shows lever 31 in a vertical initial position, the lever may be inclined toward coupler 4, offset to a greater extent than the coupler shown in FIG. 2, to move the coupler in the transverse vertical plane P into a location directly above hitch ball B as shown in broken lines of FIG. 2. Subsequent to positioning of the trailer coupler to the broken line position of FIG. 2, the trailer jack is operated to lower the trailer tongue and coupler 4 thereon to effect lowering of coupler socket 5 into place about hitch ball B. The coupler lock (not shown) is then actuated to secure the hitch ball within coupler socket 5. Removal of lever means 30 is by simple manual positioning of lever 31.

From the foregoing it will be seen that a trailer hitching operation may be accomplished by one person using the described apparatus that is adaptable to a wide range of trailers without reliance on undesired modification of trailer tongues or couplers nor the permanent mounting of any structure thereto. Additionally, the components of the present apparatus do not require high degree of skill in their use, nor is there a risk of injury to the person using the apparatus as no lifting or sudden movements of trailer structure are encountered.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. Apparatus for engaging the ball of a trailer hitch on a tow vehicle with a coupler in place on a tongue of a trailer, said apparatus comprising, a ball limit stop including a barrier, adjustable clamps for temporary installation of said limit stop on the trailer tongue for limiting travel of the ball of the trailer hitch during a trailer hitching operation, adjustable barrier support means operable with said clamps means for positioning the barrier fore and aft relative said coupler, and a manual lever having a foot for temporary engagement with the tow vehicle mounted trailer hitch and an arm pivotally attached to said lever for engagement with the trailer mounted coupler for imparting lateral movement to said coupler to vertically align the coupler with the ball whereupon subsequent lowering of the trailer tongue will engage the coupler with the ball.

2. The apparatus claimed in claim 1 wherein said clamps engage a flange on the coupler and said barrier.

3. The apparatus claimed in claim 1 wherein said adjustable barrier support means includes a support plate for rested engagement with a frontal surface of the trailer tongue and barrier supports coupling said support plate to said barrier.

4. The apparatus claimed in claim 3 wherein said barrier supports are rod shaped, said plate provided with apertures of a size to loosely receive each of said barrier supports to allow the plate to be inclined from the vertical to abut an inclined trailer frontal surface.

5. The apparatus claimed in claim 1 wherein said arm of the lever includes a retainer for temporary hooked engagement with said coupler.

6. The apparatus claimed in claim 5 wherein said lever is of angular configuration and includes a pivot coupling said arm to said lever and a foot having a recess therein for reception of the ball of the trailer hitch during use of the lever.

7. Apparatus for engaging the ball of a trailer hitch on a tow vehicle with a coupler in place on a tongue of a trailer, said apparatus comprising, a ball limit stop including a barrier, clamps for temporary installation of said limit stop on the trailer tongue for limiting travel of the ball of the trailer hitch during a trailer hitching operation, adjustable means for positioning the barrier fore and aft relative said coupler, and a manual lever having a foot for temporary engagement with the tow vehicle mounted trailer hitch and an arm pivotally attached to said lever for engagement with the trailer mounted coupler for imparting lateral movement to said coupler to vertically align the coupler with the ball whereupon subsequent lowering of the trailer tongue will engage the coupler with the ball, said adjustable means including a support plate for rested engagement with a frontal surface of the trailer tongue, barrier supports coupling said support plate to said barrier, means for locking said support plate at a desired distance from said barrier to enable use of the apparatus on different trailers, and said barrier supports being of rod shape, said plate provided with apertures of a size to loosely receive each of said supports to allow the plate to be inclined from the vertical to abut an inclined frontal surface of said trailer.

* * * * *